Figure 1:
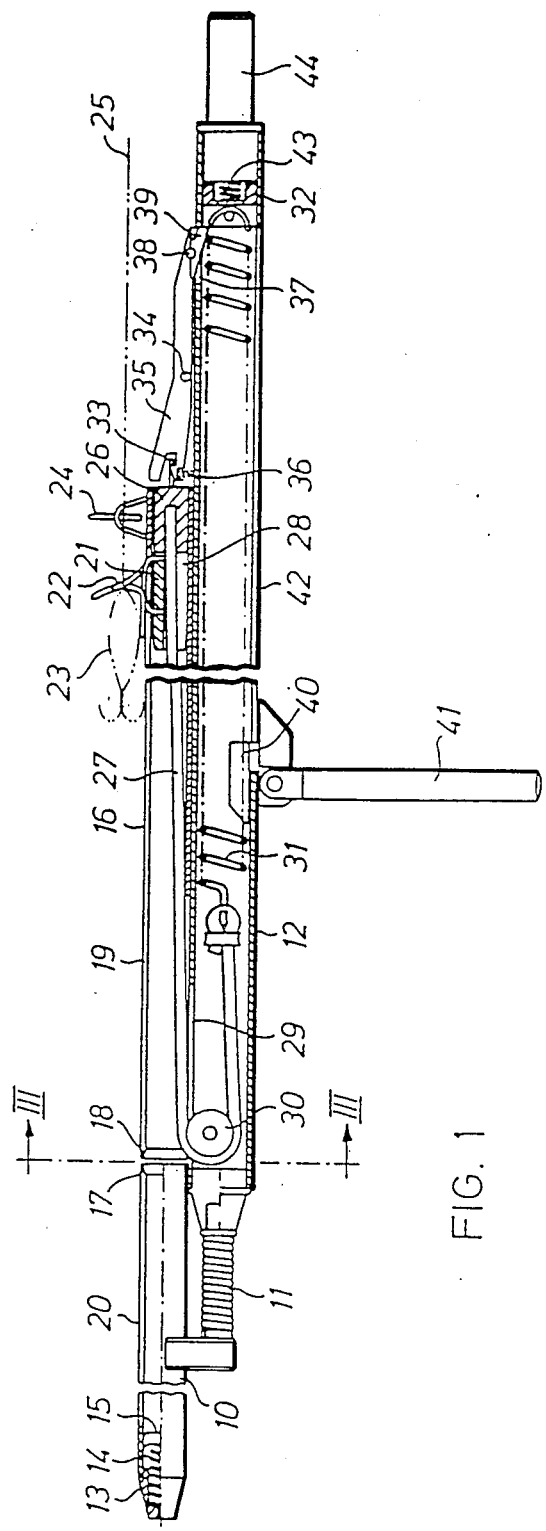

United States Patent [19]

Åkerberg

[11] Patent Number: 4,682,437
[45] Date of Patent: Jul. 28, 1987

[54] FISHING DEVICE

[76] Inventor: Magnus W. Åkerberg, Storgatan 77, S-576 00 Vetlanda, Sweden

[21] Appl. No.: 852,956
[22] PCT Filed: Aug. 9, 1984
[86] PCT No.: PCT/SE84/00273
    § 371 Date: May 23, 1986
    § 102(e) Date: May 23, 1986
[87] PCT Pub. No.: WO86/01075
    PCT Pub. Date: Feb. 27, 1986
[51] Int. Cl.⁴ ............................................. A01K 91/02
[52] U.S. Cl. ............................................. 43/19
[58] Field of Search ............................................. 43/19

[56] References Cited

U.S. PATENT DOCUMENTS

| | | | |
|---|---|---|---|
| 1,469,883 | 10/1923 | Brakers | 43/19 |
| 2,849,824 | 9/1958 | McGee | 43/19 |
| 3,279,115 | 10/1966 | Worsham | 43/19 |
| 4,040,198 | 8/1977 | Skibo | 43/19 |
| 4,127,956 | 12/1978 | Hertkorn | 43/19 |

FOREIGN PATENT DOCUMENTS 8403022 8/1984 PCT Int'l Appl. .
7306510 1/1975 Sweden .

Primary Examiner—Gene P. Crosby
Attorney, Agent, or Firm—Merchant, Gould, Smith, Edell, Welter, & Schmidt

[57] ABSTRACT

Fishing device, comprising a rod (10, 16) which forms a guide for a carriage (21) displaceable along the rod, which has means (22) for carrying along a bite (23) on a line (25) running out from a coiling or spinning reel (61). The fishing device also comprises projecting means (26, 27, 31) for chocklike displacement of the carriage from the rear end of the guide towards an abutment (15) arranged at the free end of the rod, while the bite is being projected from the carriage, stopped by the abutment, and the line being withdrawn from the coiling or spinning reel. The projecting means include a rubber cord (27), which is attached to a driving slide (26) displaceable in the guide, which can be arrested by means of holding means (33, 35) at the rear end of the rod with the rubber cord stretched between the driving slide and a point (30) between the ends of the rod, the holding means being releasable for disengagement of the driving slide, the carriage being driven by the spring bias of the rubber cord.

12 Claims, 8 Drawing Figures

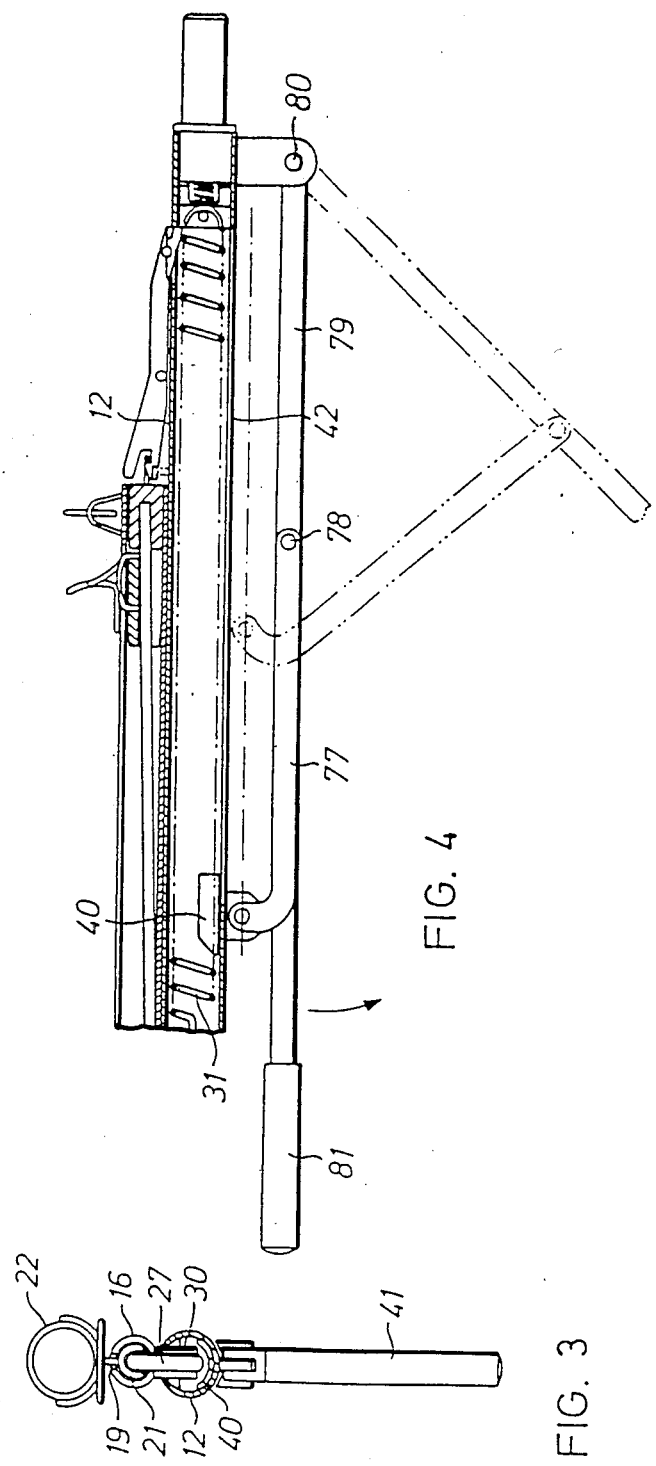

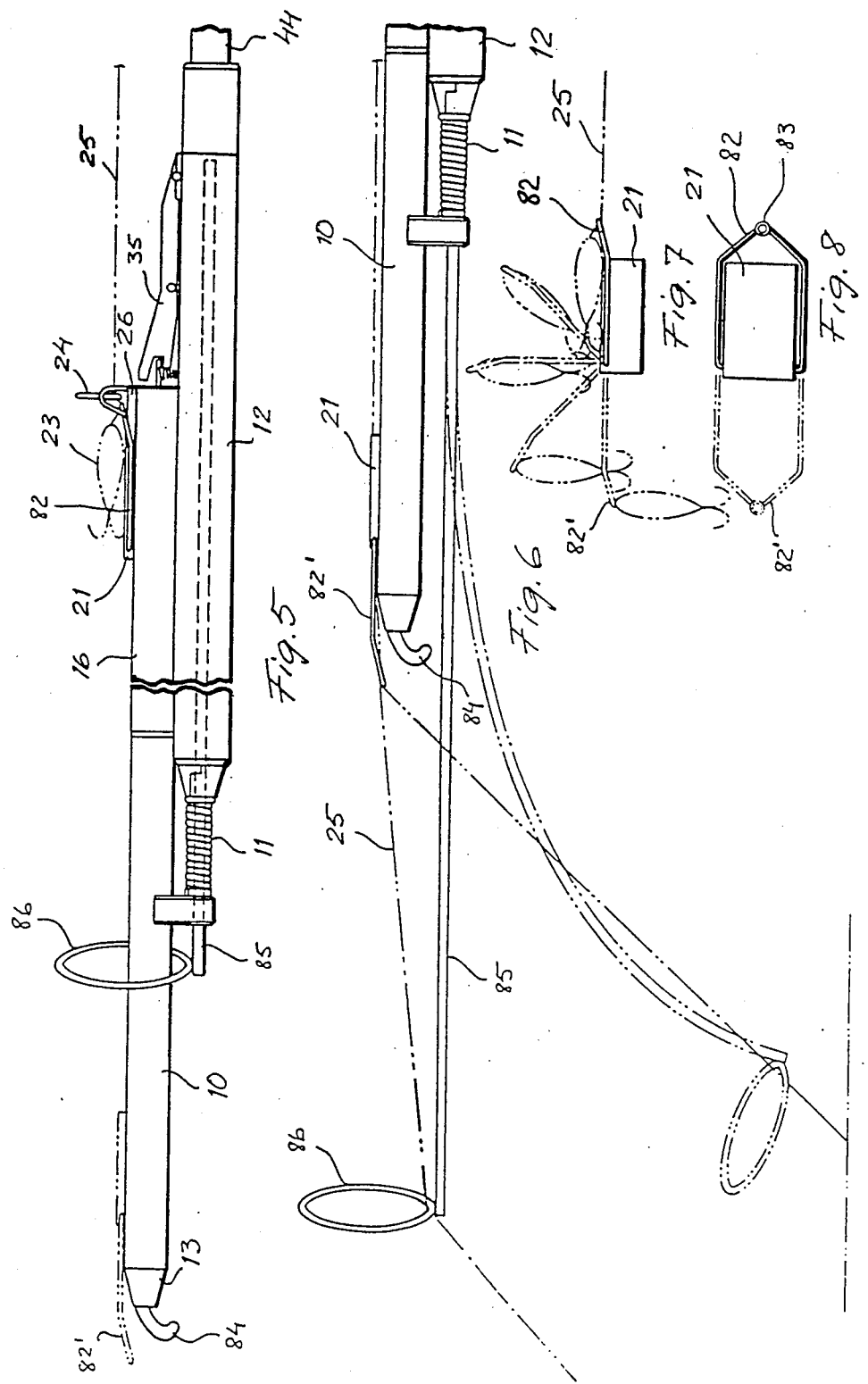

FISHING DEVICE

The invention relates to a fishing device comprising a rod with a coiling or spinning reel and with a guide extending along the rod, and a driving slide guided by the guide, for carrying along a lure on a line running out from the coiling or spinning reel, and projecting means with a rubber cord secured to the driving slide, said cord being stretched between the driving slide and a point spaced in front of the rear end of the guide, when the driving slide is displaced to the rear end of the guide where the driving slide can be arrested by holding means, for chocklike displacement of the driving slide by means of the stretched rubber cord from the rear end of the guide towards said point when the driving slide is released from the holding means, the lure being projected and the line being withdrawn from the coiling or spinning reel.

A fishing device of this type is described in U.S. Pat. No. 2,849,824.

The purpose of the invention is to develop further and improve the fishing device described therein to provide a fishing device of the kind referred to, which has projecting means more effective considering the size thereof, which can be integrated easily with the bar proper in a slender embodiment so that the fishing device generally has the appearance of a conventional casting or spinning rod and can be handled as such a rod, the fishing device of the invention also being well suited for power drive with regard to the operation of the coiling or spinning reel and also with regard to the operation of the projecting means.

Figure 2:
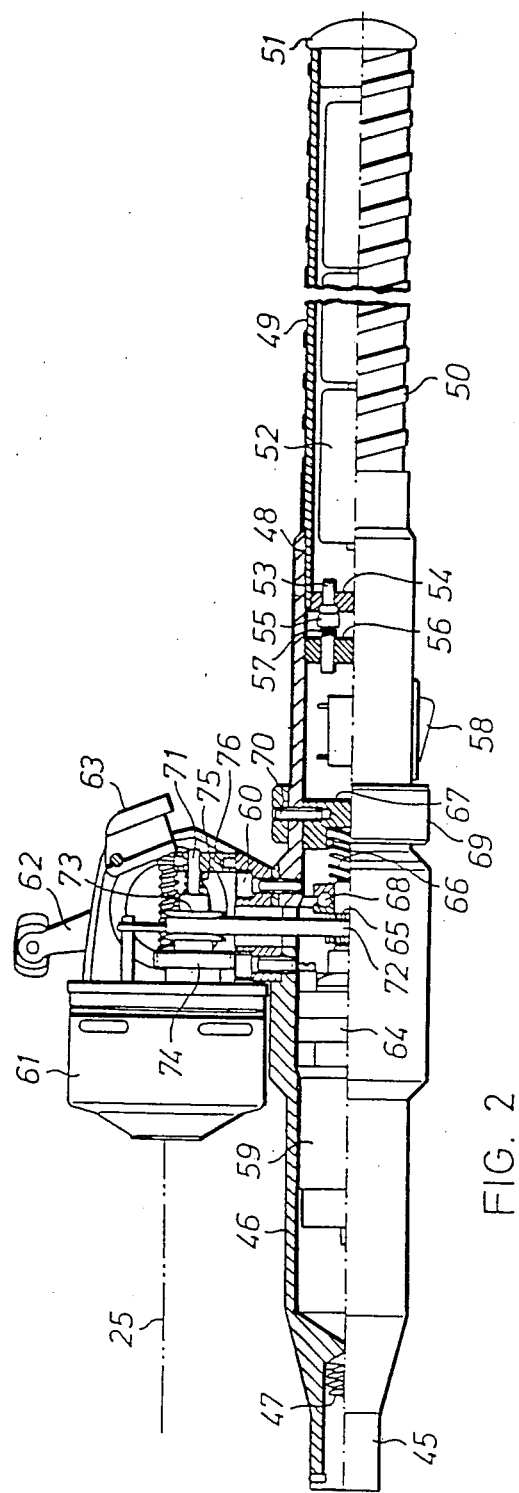

For said object the fishing device of the invention has obtained the characteristics appearing from claim 1, and in order to explain more clearly the invention this will be described in more detail below, reference being made to the accompanying drawings showing a fishing device of the invention, comprising two main portions, wherein FIG. 1 is an axial sectional view of one portion comprising the bar proper and the projecting means, FIG. 2 is a half side view and a half axial sectional view of the other portion comprising a handle and a coiling reel with power drive, FIG. 3 is an enlarged cross-sectional view taken along line III—III in FIG. 1, FIG. 4 is a fragmentary axial sectional view, partly a side view, of a modified embodiment of an operating device for the projecting means, FIG. 5 is a side view of the front end portion of the fishing device showing some important improvements of the basic concept, FIG. 6 is a fragmentary side view of the front end portion of the device shown in FIG. 5 with elements of the device in other operative positions, FIG. 7 is a side view of the carriage of the device shown in FIGS. 5 and 6 with a U-shaped wire bow pivotally mounted thereon, shown in different positions, and FIG. 8 is a plan view of the carriage shown in FIG. 7.

The two main portions of the fishing device of the invention, shown in FIG. 1 and FIG. 2, respectively, are to be interconnected axially aligned in the complete fishing device as will be described later on. One main portion shown in FIG. 1 and also in FIG. 3 will first be described in detail.

The main portion of FIGS. 1 and 3 comprises a tubular rod 10 which is supported by means of a heavy spring 11 on a spring housing 12 forming part of the projecting means. The rod can have substantially the same length as a conventional casting or spinning rod and can yield elastically when loaded due to the elastic support. At the free end thereof the rod is closed by a plug 13 receiving a helical spring 14 for an abutment 15 which is displaceable axially. At the rear end, the tubular rod connects to a guide or socket 16 having substantially the same outer and inner diameters as the rod, and this socket is connected on top of the spring housing 12 axially aligned with the rod. At the ends of the rod and the socket, facing each other, there is an inner chamfer 17 and 18, respectively, and these ends are somewhat spaced to allow elastic deflection of the rod in relation to the socket. A longitudinal slot 19 on top of the socket 16 connects to a longitudinal slot 20 on top of the tubular rod. A carriage 21 is freely displaceable in the socket 16 and the rod 10 and has a wire carrier 22 projecting through the slot 16 and the slot 20, respectively. This carrier is formed to receive a lure which is diagrammatically indicated by dot-and-dash lines 23, a fishing line to which the lure is attached, extending through the carrier 22 and a line guide 24, also of wire, mounted on top of the socket, as is indicated by a dot-and-dash line 25, representing the fishing line.

Inside the socket 16 and the rod 10, also a slide 26 is displaceably guided, which is located behind the carriage 21. A rubber cord 27 is connected to the slide and extends through a groove 28 in the lower side of the carriage 21 located in front of the slide 26. The rubber cord is extended through a slot 29 into the spring housing where it is extended around a pulley 30 rotatably mounted in the spring housing, to be connected at the other end thereof to one end of a helical tension spring 31, the other end of which is connected to a piston 32 axially displaceable in the spring housing. The slide 26 has a tongue 33 projecting backwards for engagement with a latch 35 pivotally mounted on top of the spring housing 12 at 34, said latch being kept engaged with the tongue 33 by means of a compression spring 36 to be disengaged from the tongue by depression of the latch manually against the bias of the spring 36. In a slot 37 in the spring housing, a clasp 39 is pivotally mounted at 38, by means of which the piston 32 can be maintained in the rear position shown against the bias of the stretched tension spring 31. A carrier 40 provided with a handle 41, is displaceable axially along the spring housing 12 in a slot 42 for stretching the tension spring. By means of this carrier the piston 32 can be carried along towards the rear end for stretching the tension spring 31 when the slide 26 is retained by means of the latch 35 engaging the tongue 33 under the bias of the spring 36. At the rear end of the spring guide, the clasp 39 then will be pushed away to engage later in front of the piston 32 and retain the piston in the position shown. A release spring 43 for the piston is arranged in the rear end of the spring housing.

When the tension spring 31 and also the rubber cord 27 have been stretched in the manner described and the slide 26 is released by depression of the latch 35 against the bias of the spring 36, the slide will be drawn energetically to the left as seen in FIG. 1 and then will carry along the carriage 21 in the movement thereof through the socket 16. The bite 23 will be moved together with the carriage 21 by the carrier 22 while the fishing line 25 is being withdrawn. When the slide 26 reaches the region at the pulley 30 at the front end of the tube 16, the slide will be retarded but the carriage 21 can continue into the tubular rod 10 by the inertia imparted to the carriage, and the carriage will move axially through the bar 10 towards the front end thereof where the carriage will be retarded by the abutment 15 biased by the spring 14. The lure 23, however, will continue the movement thereof due to inertia and will be projected from the bar, carrying the fishing line 25 along.

The advantage of the projecting means for the lure 23, shown and described and comprising the rubber cord 27 as well as the helical tension spring 31, is that the projecting means can be given small dimensions and can be made compact such that it can be easily integrated into the fishing device, a large driving force on the carriage 21 at the same time being obtained, which in turn provides a large casting length.

When the projection has taken place preparation for a new projection is made by releasing the piston 32, the slide 26 then being retained in the rear end position thereof by means of the latch 35. Then, the tension spring 31 is stretched by moving the piston 32 by means of the carrier 40 to the rear end position thereof and locking the piston in this position by means of the clasp 39.

The main portion of the fishing device of the invention, shown in FIGS. 1 and 3, has at the rear end of the spring housing 12 a pin 44 forming one part of a bayonet coupling, the other part of which comprises a socket 45, which can be passed onto the pin 44 and is arranged at the front end of the other main portion of the fishing device of the invention, which is shown in FIG. 2 and now will be described in more detail.

The socket 45 is formed at one end of a motor housing 46 and is provided with a compression spring 47 at the bottom thereof, against which the pin 44 can be engaged and which by the pressure thereof maintains the bayonet engagement between the coupling elements 44 and 45. By means of another bayonet coupling 48 the motor housing is detachably connected with a battery housing 49, arranged as a handle on the fishing device, which is provided on the outside thereof with a grip winding 50 and has at the end a support knob 51 arranged as an end wall. The battery housing receives a suitable number of conventional torque batteries 52 which are connected, by connections not shown in detail herein, to two contact pins one of which is shown at 53. These contact pins are attached to an insulating end wall 54 in the battery housing and are adapted to co-operate with contact pins in the motor housing, one of which is shown at 55. These latter contact pins are displaceably mounted in an insulating wall 56 in the motor housing and are biased by a spring 57 to be kept engaged with their associated contact pins 53 against the spring bias when the battery housing 50 is connected to the motor housing 46. The contact pins 55 are connected in a manner not shown in detail herein, via an electric switch 58 to an electric drive motor 59 arranged in the motor housing 46 for operating a coiling reel 61 attached on top of the motor housing by means of screws 60. This reel can be of a conventional construction and it can also be replaced by a spinning reel, but irrespective of the reel being of one type or the other, it is modified for power operation in the manner to be described later. The coiling reel 61 is for the purpose of retracting the fishing line 25 which is indicated also in FIG. 2 by a dot-and-dash line. The coiling reel has a crank 62 for manual operation and a push button 63 for engaging the reel in the conventional manner.

The motor 59 is connected with the input shaft of an epicyclic gear 64 the output shaft of which is connected to a pinion 65 via an overload clutch. This clutch can comprise a cross pin in the output shaft of the epicyclic gear, the pin being received by corresponding milled grooves in the pinion 65. By means of a compression spring 66 which is engaged between a rotatable and axially displaceable disc 67 in the motor housing and an axial ball bearing 68 transmitting the pressure of the compression spring 66 to the pinion 65, said pinion is being pressed against the cross pin in the output shaft of the epicyclic gear, which is received by said grooves. The 9rooves are chamfered at one side such that the cross pin can disengage the grooves in the driving direction of the motor 59 if the resistance against rotation of the pinion should increase over a certain value, by the pinion being pushed aside by the cross pin against the bias of the spring 66. The spring bias can be adjusted by means of a ring 69 which is rotatable and axially displaceable on the outside of the motor housing. By means of a pin 70 the ring ehgages into the disc 67, the pin 70 being displaceable in a slot in the motor housing 46, which forms an angle of 45° with the axial direction of the motor housing. By the ring 69 being rotated the ring is displaced guided by the oblique slot such that an axial movement at the same time is imparted to the ring, such movement being transmitted to the disc 67 to increase or decrease the bias of the spring 66.

For transmitting the driving force from the pinion 65 to the reel shaft 71 of the coiling reel a toothed belt 72 is engaged with the pinion 65 and a gear wheel 73 rotatably mounted to the reel shaft. This gear wheel is connected by means of a ratchet clutch to a gear wheel 74 fixedly mounted to tne reel shaft 71. The reel clutch comprises a tooth on the gear wheel 73, which is obliquely chamfered in one rotational direction and is adapted to be received by a groove in the gear wheel 74 and to be maintained in this groove by a compression spring 75 engaged between the gear wheel 73 which is not only rotatable but also axially displaceable on the roller shaft 71, and a shaft bearing 76. The tooth is chamfered in such a way that it will be kept engaged with the groove in the gear wheel 74, when the gear wheel 73 is driven from the motor 59 over the transmission described, but allows that the gear wheel 74 is rotated in relation to the gear wheel 73 in the same direction as that in which the gear wheel 73 is driven by the motor, by the reel shaft 51 being driven manually from the crank 62. Thus, it is possible to operate the coiling reel 61 manually without this being impeded by the motor.59 and the transmission thereof, which may be actualized if the force in the fishing line increases to such value that the ratchet clutch between the output shaft of the epicyclic gear 64 and the pinion 65 slips. When the fishing line is retracted by means of the crank 62 it is desired that the gear wheel 73, the toothed belt 72, the pinion 65 and the motor 59 will not be rotated, and this is avoided by the ratchet clutch between the gear wheels 73 and 74 being put into operation and disengages the gear wheel 74 from the gear wheel 73. However, the retraction of the fishing line normally should take place by connecting the motor 59 via the switch 58, the motor being energized from the batteries 52 to drive the coiling reel 61.

It is obvious that the transmission between the motor 59 and the coiling reel 61 can be arranged in another manner than that described herein and this is true particularly as far as the overload and ratchet clutches are concerned, which can be of another known construction than that described herein.

The latch 35 can be actuated electrically by means of a solenoid which is energized from the batteries 52 via a switch arranged on the main portion in FIG. 2. Also the spring 31 can be stretched by means of a motor, e.g. by tne carrier 40 being driven by a screw spindle extending along the spring housing 42 and connected to the motor 59 or to a separate motor. It is also conceivable to arrange the screw spindle so as to be rotated manually. A further modification of the stretching means is conceivable and is shown in FIG. 4.

According to FIG. 4, the carrier 40 is connected at 78 by means of a link 77 to a lever 79 which is mounted to the spring housing 12 at 80. The lever is provided with a handle 81. When the lever is swung downwards in counter-clockwise direction from the position shown, the carrier 40 will be displaced to the right as is indicated in FIG. 4 by the lever and the link being shown by dot-and-dash lines in an intermediate position. This stretching means of the pneumatic gun type makes possible that a large stretching force is imparted to the spring.

The fishing device described will be easily and conveniently handled by electric operation of the coiling reel 61 as well as the stretching means of the spring 31, but in the simplest embodiment the fishing device can be constructed with the simple stretching means of FIG. 1 and be provided with a handle on which a manually operated coiling or spinning reel is mounted, which lacks completely the electric driving means described herein.

With reference to FIGS. 5 to 8 there is shown therein a preferred embodiment of the carriage 21. In this embodiment the wire carrier 22 disclosed in the embodiment described so far is replaced by a U-shaped wire bow 82 which is pivotally mounted to the carriage for swinging movement about a transverse axis. The limbs of the bow are located on the outside of the sides of the carriage and the bow is mounted by means of the end portions of the limbs, which are angled to project towards each other and are received in bores in the carriage. Thus, the bow can be swung between the position shown by solid lines in FIGS. 7 and 8 and the position shown by dot-and-dash lines 82' in said figures.

The web of the bow 82 forms an eye 83, and the fishing line 25 passes through this eye. When the carriage 21 is in the retracted position shown in FIG. 5, the bow 82 is in the position shown by solid lines in FIGS. 5, 7, and 8 and the lure 23 attached to the fishing line 25, is located on top of the carriage 21. A depression may be formed in the top surface of the carriage to receive the lure and keep it positioned on the carriage. When the carriage is moved to the left end of the bar 10 in the manner previously described with reference to FIGS. 1 to 4, the lure 23 will be carried along by the carriage, the fishing line 25 being withdrawn from the reel 61. The lure will be thrown out by inertia when the carriage 21 is stopped at the abutment 15 (FIG. 1) and at the same time the bow 82 will swing counter-clockwise to the position 82' shown in FIGS. 5, 7, and 8 by dot-and-dash lines and in FIG. 6 by solid lines.

When the lure is withdrawn by the fishing line 25 being wound onto the reel, the bow will be swung back to the original position as shown in FIG. 7. The lure will eventually engage the bow and thus the bow, will be lifted by means of the fishing line, the lure being gently laid down onto the top surface of the carriage 21 as illustrated in FIG. 7 indicating several phases in the movement of the bow when swinging clockwise on the carriage.

There may be a risk of the lure entangling the front end of the bar 10 when the bite is being withdrawn, and in order to avoid this risk the front end of the bar is provided with a deflector 84 in the embodiment shown in FIGS. 5 and 6. This deflector preferably is a channelled metal sheet attached to the plug 13 and projecting downwards and inwards from the plug. The deflector joins the surface of the plug and preferably is formed as a sector of a flaring bell.

When one has a nibble during fishing, the fishing line may be exposed to jerks which may cause breakage of the fishing line. In order to avoid this the fishing device shown in FIGS. 5 and 6 is provided with an elastically flexible stick 85 of a conventional design such as reinforced plastic material. The stick is displaceably mounted to the housing 12 so as to be displaced between the retracted position shown in FIG. 5 and the projected position shown in FIG. 6. At the free end of the stick 85 there is provided a circular loop 86. When the fishing device is triggered the stick 85 should be in the retracted position shown in FIG. 5. In this position, the loop 86 encircles the rod 10, and this loop is sufficiently large to allow the carriage 21 with the lure 23 carried thereon to pass through the loop when moving to the free end of the bar. When the lure has been launched, the stick 85 is extended to the projected position shown in FIG. 6 with the fishing line 25 passing through the loop 86. When the fishing line is loaded with the stick in this position, jerks in the fishing line can be compensated for by the stick yielding elastically as disclosed by dot-and-dash lines in FIG. 6 in the same manner as a conventional fishing rod.

Before the fishing device is "reloaded" for a new "shot", the stick 85 is returned to the position shown in FIG. 5 prior to the bite being located on the carriage as shown in FIG. 5 and the carriage being returned to the position shown by solid lines in FIG. 5.

I claim:

1. Fishing device comprising a rod (10, 16) with a coiling or spinning reel (61) and with a guide extending along the rod, and a driving slide (26) guided by the guide, for carrying along a lure (23) on a line (25) running out from the coiling or spinning reel, and projecting means (26, 27, 31) with a rubber cord (27) secured to the driving slide, said cord being stretched between the driving slide and a point (30) spaced in front of the rear end of the guide, when the driving slide is displaced to the rear end of the guide where the driving slide can be arrested by holding means (33, 35),for chocklike displacement of the driving slide by means of the stretched rubber cord from the rear end of the guide towards said point when the driving slide is released from the holding means, the lure being projected and the line being withdrawn from the coiling or spinning reel, characterized in that the guide is arranged in the rod (10, 16) proper with said point (30) located between the ends of the guide and that a carriage (21) for supporting the lure (23) is arranged as a separate element displaceable in the guide, to be carried along in front of the driving slide (26) at the displacement thereof under the bias of the stretched rubber cord (27) and to continue by inertia towards an abutment (15) arranged at the free end of the rod, at termination of the movement of the driving slide at said point.

2. Fishing device as claimed in claim 1, characterized in that the rod (10, 16) is tubular and that the carriage (21) and the driving slide (26) are displaceable through the tube which forms a longitudinal slot (19, 20) for receiving a carrier (22) projecting from a carriage.

3. Fishing device as claimed in claim 2, characterized in that the rod comprises a front portion (10) and a rear portion (16), the front portion of which can be angled in relation to the rear portion against spring bias (11).

4. Fishing device as claimed in claim 1, characterized in that the rubber cord (27) at said point is extended around a pulley (30) and is connected to one end of a tension spring (31) arranged substantially in parallel to the rod (10, 16).

5. Fishing device as claimed in claim 4, characterized in that the tension spring (31) at the other end thereof is connected to an anchoring element (32) displaceably guided which can be arrested in a position with the spring stretched.

6. Fishing device as claimed in claim 5, characterized in that the anchoring element (32) is displaceable in a spring housing (12) for receiving the tension spring (31), which is arranged substantially in parallel to the rod (10, 16) and is connected to the rear portion (16) thereof.

7. Fishing device as claimed in claim 5, characterized in that means (40) are provided for displacing the anchoring element (32) while the spring (31) is being stretched.

8. Fishing device as claimed in claim 1, characterized in that a handle (46, 49) with a coiling or spinning reel (61) for receiving the line (25) is detachably connected to the rod (10, 16).

9. Fishing device as claimed in claim 8, characterized in that the handle comprises a motor housing (46) with an electric drive motor (59) operatively connected to the coiling or spinning reel (61), and a battery housing (49) detachably connected to the motor housing, for receiving electric batteries (52).

10. Fishing device as claimed in claim 1, characterized in that a U-shaped bow (82) is pivotally mounted to the carriage (21) at the ends of the limbs thereof for swinging movement about a cross axis of the carriage at the front end thereof, the web of said bow forming an eye (83) for the fishing line (25) passing therethrough.

11. Fishing device as claimed in claim 1, characterized in that an elastically flexible stick (85) is mounted to the rod (10) extending along the rod, for displacement between a retracted position and a projecting position, the stick extending beyond the front end of the rod in said latter position, a loop (86) being arranged at the front end of the stick to guide the fishing line (25) running freely therethrough, said loop encircling the rod when the stick is in the retracted position, to form a passage for the carriage with the lure located thereon.

12. Fishing device as claimed in claim 1, characterized in that a guide element (84) is arranged at the front end of the rod (10) to guide the lure (23) onto the rod and the carriage (21) when the fishing line is being withdrawn.

* * * * *